(12) United States Patent
Yang et al.

(10) Patent No.: US 12,046,210 B2
(45) Date of Patent: Jul. 23, 2024

(54) ARRAY SUBSTRATE, LIQUID CRYSTAL DISPLAY PANEL, AND DISPLAY APPARATUS

(71) Applicants: Beijing BOE Display Technology Co., Ltd., Beijing (CN); BOE Technology Group Co., Ltd., Beijing (CN)

(72) Inventors: Xinlan Yang, Beijing (CN); Shijun Wang, Beijing (CN); Wenkai Mu, Beijing (CN); Yi Liu, Beijing (CN); Bo Feng, Beijing (CN); Yang Wang, Beijing (CN); Zhan Wei, Beijing (CN); Tengfei Ding, Beijing (CN); Jun Fan, Beijing (CN); Yuke Tai, Beijing (CN); Gongda Chen, Beijing (CN); Guangshuang Lv, Beijing (CN); Yingzi Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 17/621,188

(22) PCT Filed: Oct. 29, 2020

(86) PCT No.: PCT/CN2020/124947
§ 371 (c)(1),
(2) Date: Dec. 20, 2021

(87) PCT Pub. No.: WO2022/087987
PCT Pub. Date: May 5, 2022

(65) Prior Publication Data
US 2023/0260472 A1    Aug. 17, 2023

(51) Int. Cl.
G09G 3/36         (2006.01)
G02F 1/1335       (2006.01)
G06V 40/13        (2022.01)

(52) U.S. Cl.
CPC ..... *G09G 3/3607* (2013.01); *G02F 1/133514* (2013.01); *G06V 40/1318* (2022.01); *G09G 2300/0452* (2013.01)

(58) Field of Classification Search
CPC .......... G09G 3/3607; G09G 2300/0452; G02F 1/133514; G06V 40/1318
See application file for complete search history.

(56) References Cited

U.S. PATENT DOCUMENTS 4,394,773 A      7/1983  Ruell
2018/0150668 A1*  5/2018  Li ................... H01L 29/78669
(Continued)

FOREIGN PATENT DOCUMENTS

| CN | 108803110 A | 11/2018 |
| CN | 108828816 A | 11/2018 |
| CN | 109886252 A | 6/2019 |

*Primary Examiner* — Adam R. Giesy
(74) *Attorney, Agent, or Firm* — IPro, PLLC

(57) ABSTRACT

Provided is an array substrate including: a first base, wherein the first base is provided with a plurality of pixel regions, and the pixel region includes a white sub-pixel region and at least two color sub-pixel regions; and a plurality of photosensitive devices disposed on the first base, wherein an orthographic projection of the photosensitive device onto the first base at least partially overlaps with the white sub-pixel region. A liquid crystal display panel and a display apparatus are also provided.

16 Claims, 16 Drawing Sheets

(56) References Cited

U.S. PATENT DOCUMENTS

2019/0294290 A1* 9/2019 Pu .......................... G06F 3/0443
2020/0227441 A1* 7/2020 Lin ...................... H10K 59/131
2021/0405414 A1   12/2021 Liu

* cited by examiner

ARRAY SUBSTRATE, LIQUID CRYSTAL DISPLAY PANEL, AND DISPLAY APPARATUS

CROSS-REFERENCE TO RELATED APPLICATION

This application is a US national stage of international application No. PCT/CN2020/124947, filed on Oct. 29, 2020, the disclosure of which is herein incorporated herein by reference in its entirety.

TECHNICAL FIELD

The present disclosure relates to the field of display technologies, and in particular, to an array substrate, a liquid crystal display panel, and a display apparatus.

BACKGROUND

With the development of display technologies, the functions of a display apparatus become increasingly rich. An increasing number of display apparatuses are integrated with a fingerprint recognition function. These display apparatuses may be smart phones, tablet computers, wearable devices, and the like.

At present, a display apparatus integrated with a fingerprint recognition function generally includes a display panel and a fingerprint recognition module. The display panel is provided with a display region and a non-display region. The fingerprint recognition module is disposed in the non-display region.

SUMMARY

Embodiments of the present disclosure provide an array substrate, a liquid crystal display panel, and a display apparatus. The technical solutions are as follows.

In an aspect, an array substrate is provided. The array substrate includes:
- a first base, wherein the first base is provided with a plurality of pixel regions, and the pixel region includes a white sub-pixel region and at least two color sub-pixel regions; and
- a plurality of photosensitive devices disposed on the first base, wherein an orthographic projection of the photosensitive device onto the first base at least partially overlaps with the white sub-pixel region.

Optionally, the orthographic projection of the photosensitive device onto the first base is within the white sub-pixel region.

Optionally, the plurality of pixel regions are arranged in an array in a plurality of rows; and the photosensitive device includes a first part and a second part, wherein an orthographic projection of the first part of the photosensitive device onto the first base is within the white sub-pixel region, and an orthographic projection of second part of the photosensitive device onto the first base is between two adjacent rows of the pixel regions.

Optionally, the array substrate further includes a plurality of first gate lines disposed on the first base, wherein two first gate lines are arranged between two adjacent rows of pixel regions, and the two first gate lines are respectively connected to sub-pixels in the two adjacent rows of pixel regions; and the orthographic projection of the second part of the photosensitive device onto the first base is between two adjacent target regions, and the target region includes two adjacent rows of pixel regions and a region that is between the two rows of pixel regions and is provided with the two first gate lines.

Optionally, the orthographic projection of the first part of the photosensitive device onto the first base is within two white sub-pixel regions, and the two white sub-pixel regions are respectively disposed in two adjacent rows of pixel regions.

Optionally, a quantity of the plurality of photosensitive devices is equal to a quantity of the plurality of pixel regions; the plurality of photosensitive devices and the plurality of pixel regions are disposed in one-to-one correspondence, and the orthographic projection of the photosensitive device onto the first base at least partially overlaps with the white sub-pixel region in the corresponding pixel region.

Optionally, the array substrate further includes a driving circuit disposed on the first base and electrically connected to the photosensitive device, wherein an orthographic projection of the driving circuit onto the first base is within the orthographic projection of the photosensitive device onto the first base.

Optionally, the array substrate further includes a second gate line disposed on the first base and connected to the driving circuit, wherein the second gate line is disposed between two adjacent rows of pixel regions.

Optionally, the photosensitive device includes a light-shielding electrode, a photoelectric conversion layer, and a light-transmitting electrode that are laminated, wherein the light-shielding electrode is closer to the first base than the light-transmitting electrode.

Optionally, the array substrate further includes a sub-pixel disposed in each sub-pixel region in the pixel region, wherein the sub-pixel includes a first transistor disposed on the first base as well as a pixel electrode and a common electrode that are disposed on a side of the first transistor distal from the first base, the pixel electrode being connected to the first transistor.

Optionally, the at least two color sub-pixel regions include a red sub-pixel region, a green sub-pixel region, and a blue sub-pixel region; and the at least two color sub-pixel regions and the white sub-pixel region in the pixel region are arranged in one row, or, the at least two color sub-pixel regions and the white sub-pixel region in the pixel region are arranged in an array in two rows and two columns.

In another aspect, a liquid crystal display panel is provided. The liquid crystal display panel includes:
- an array substrate and a color filter substrate facing each other and a liquid crystal layer that is disposed between the array substrate and the color filter substrate, and the array substrate is any foregoing array substrate.

Optionally, the color filter substrate includes a second base and a black matrix that is disposed on the second base; the black matrix is provided with an opening, and an orthographic projection of the opening onto the first base at least partially overlaps with the orthographic projection of the photosensitive device onto the first base.

Optionally, the color filter substrate further includes color resist blocks of at least two colors that are disposed on the second base and correspond to the at least two color sub-pixel regions.

In still another aspect, a display apparatus is provided. The display apparatus includes any foregoing liquid crystal display panel.

The beneficial effects of the technical solutions provided in the embodiments of the present disclosure are at least as follows.

The array substrate includes a first base and a plurality of photosensitive devices disposed on the first base. The photosensitive device can recognize fingerprints. In this way, the screen-to-body ratio of a display apparatus manufactured by using the array substrate is effectively increased. When an orthographic projection of the photosensitive device in the array substrate onto the first base at least partially overlaps with a white sub-pixel region, as a part of the photosensitive device is disposed in the white sub-pixel region, under the premise of ensuring that the photosensitive device has relatively high accuracy of recognizing fingerprints, the distance between two adjacent rows of pixel regions in a plurality of pixel regions can be decreased appropriately, such that the pixel aperture ratio of the array substrate is effectively increased. Thus, the display apparatus manufactured by using the array substrate has a good display effect.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, a display apparatus may include an array substrate and a color filter substrate as well as a liquid crystal layer disposed between the array substrate and the color filter substrate. When the display apparatus needs to implement a fingerprint recognition function, a module having the fingerprint recognition function needs to be disposed in the display apparatus. However, as the fingerprint recognition module is disposed in a non-display region, the non-display region generally has a relatively big area, which results in a relatively low screen-to-body ratio of the display apparatus.

Figure 1:
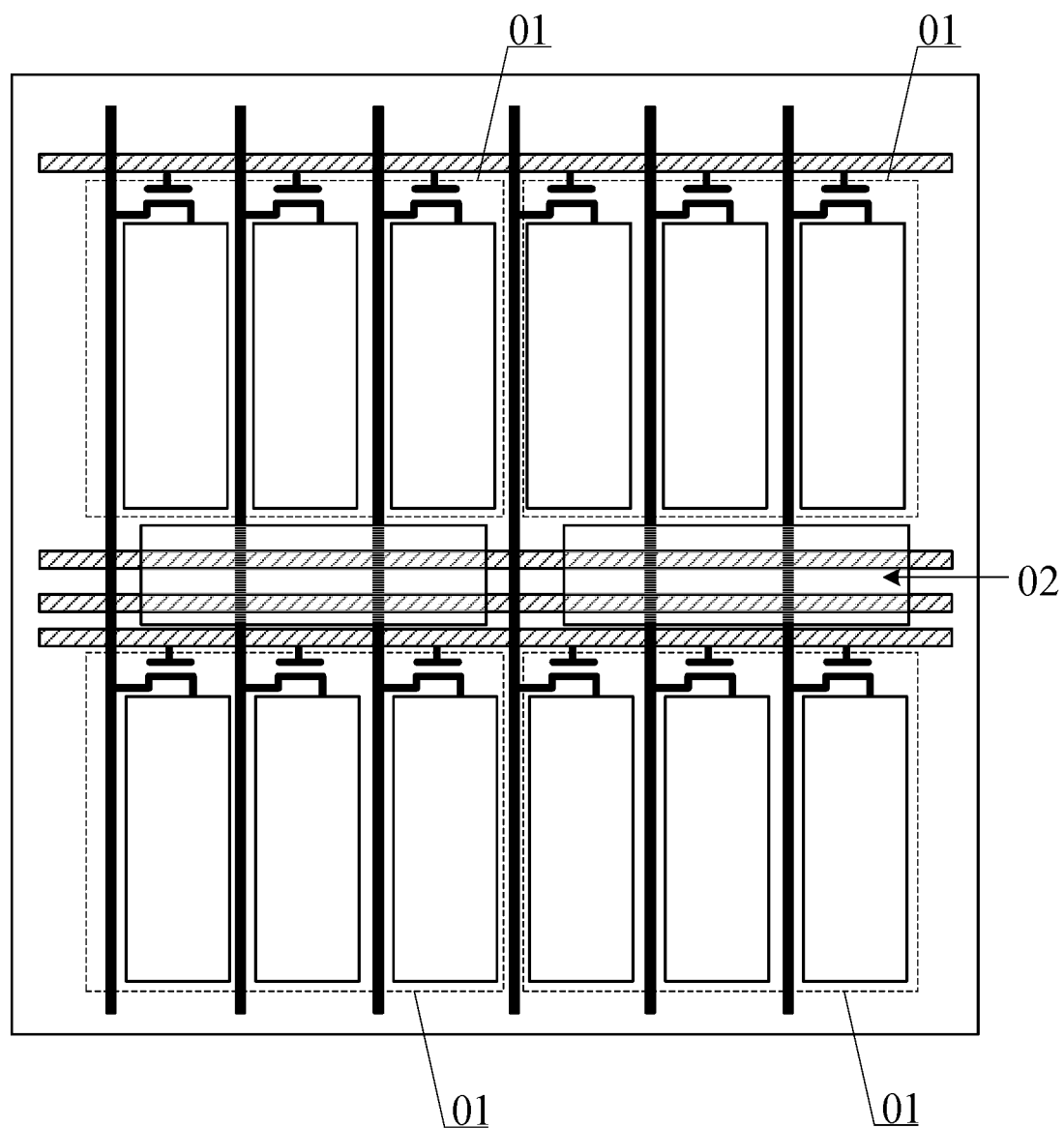
FIG. 1 is a top view of an array substrate in the related art.

To increase the screen-to-body ratio of the display apparatus, the module having the fingerprint recognition function may be integrated in the array substrate in the display apparatus. For example, referring to FIG. 1, which is a top view of an array substrate in the related art, the array substrate is provided with a plurality of pixel regions 01. The plurality of pixel regions 01 may be arranged in an array in a plurality of rows. A photosensitive device 02 may be integrated between every two adjacent rows of pixel regions 01 in the array substrate. The photosensitive device 02 can recognize fingerprints.

However, when the photosensitive device 02 is disposed between two adjacent rows of pixel regions 01, to ensure that the photosensitive device 02 has relatively high accuracy of recognizing fingerprints, the distance between the two adjacent rows of pixel regions 01 needs to be increased, which causes the pixel aperture ratio of the array substrate to decrease. Thus, the manufactured display apparatus has a relatively poor display effect.

Figure 2:
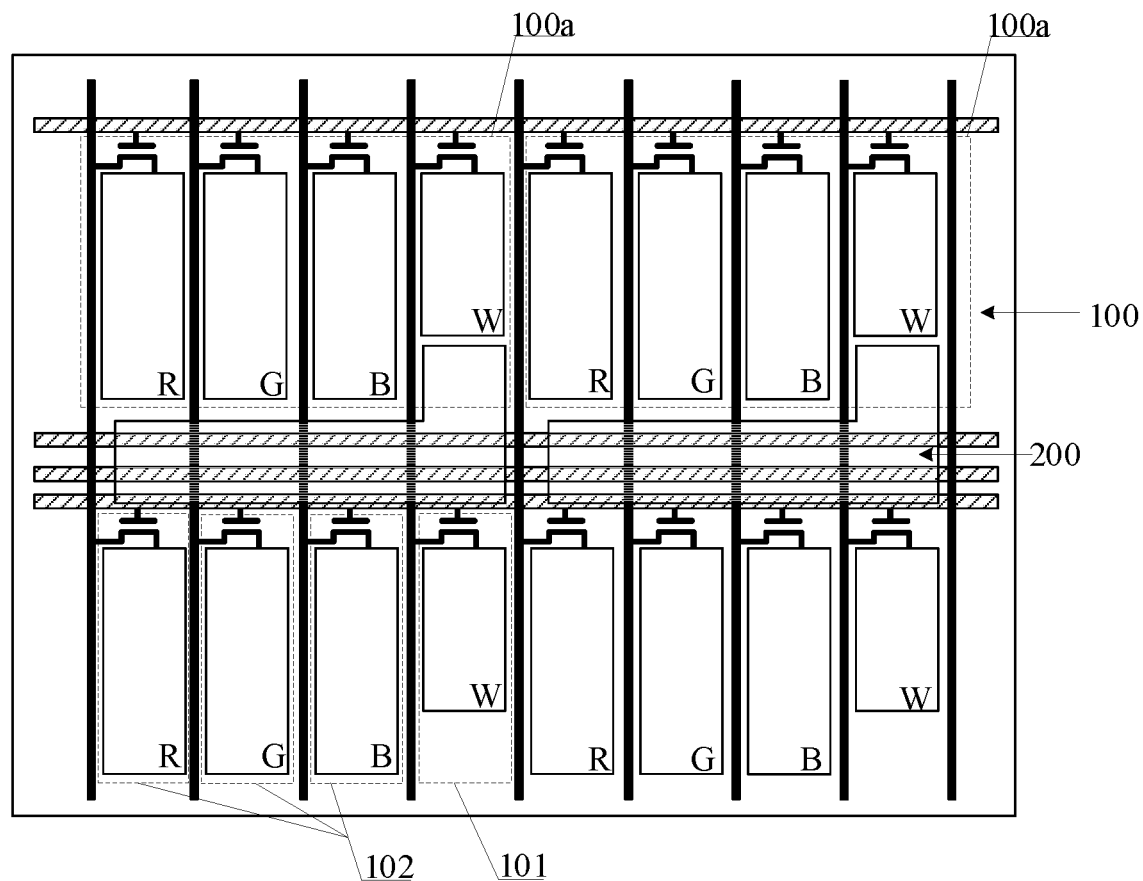
FIG. 2 is a top view of an array substrate according to an embodiment of the present disclosure.

Referring to FIG. 2, which is a top view of an array substrate according to an embodiment of the present disclosure, the array substrate 000 may include:

a first base 100 and a plurality of photosensitive devices 200 disposed on the first base 100.

The first base 100 is provided with a plurality of pixel regions 100a. The pixel region 100a may include a white sub-pixel region 101 and at least two color sub-pixel regions 102.

An orthographic projection of the photosensitive device 200 onto the first base 100 may at least partially overlap with the white sub-pixel region 101 of the first base 100. A display apparatus manufactured by using the array substrate 000 can recognize fingerprints through the photosensitive device 200, which increases the screen-to-body ratio of the display apparatus.

In the present disclosure, the array substrate 000 may further include a white sub-pixel W disposed in the white sub-pixel region 101 as well as at least two color sub-pixels disposed in the at least two color sub-pixel regions 102. For example, the at least two color sub-pixels may include a red sub-pixel R, a green sub-pixel G, and a blue sub-pixel B. When the display apparatus that is subsequently manufactured by using the array substrate 000 needs to display a picture, if the brightness of light rays emitted by the white sub-pixel W is the same as the sum of brightness of light rays emitted by the at least two color sub-pixels, the display brightness of the display apparatus can be improved without affecting the display effect of the picture. However, light rays emitted by a backlight source in the display apparatus have uniform brightness. When the aperture ratio of the white sub-pixel W is the same as the aperture ratio of each color sub-pixel, the light rays emitted by the white sub-pixel W is usually excessively bright. For this, at present, the aperture ratio of the white sub-pixel W is usually reduced to ensure that the brightness of the light rays emitted by the white sub-pixel W is the same as the sum of brightness of the light rays emitted by the at least two color sub-pixels.

In this case, when the orthographic projection of the photosensitive device 200 in the array substrate 000 onto the first base 100 at least partially overlaps with the white sub-pixel region 101, the photosensitive device 200 does not affect the aperture ratio of the white sub-pixel W in the white sub-pixel region 101. In addition, as a part of the photosensitive device 200 is disposed in the white sub-pixel region 101, under the premise of ensuring that the photosensitive device 200 has relatively high accuracy of recognizing fingerprints, the distance between two adjacent rows of pixel regions 100a in the plurality of pixel regions 100a can be decreased appropriately, such that the pixel aperture ratio of the array substrate 000 is effectively increased. Thus, the display apparatus that is manufactured by using the array substrate 000 has a better display effect.

In summary, the array substrate provided in the embodiment of the present disclosure includes a first base and a plurality of photosensitive devices disposed on the first base. The photosensitive device can recognize fingerprints. In this way, the screen-to-body ratio of a display apparatus manufactured by using the array substrate is effectively increased. When the orthographic projection of the photosensitive device in the array substrate onto the first base at least partially overlaps with the white sub-pixel region, as a part of the photosensitive device is disposed in the white sub-pixel region, under the premise of ensuring that the photosensitive device has relatively high accuracy of recognizing fingerprints, the distance between the two adjacent rows of pixel regions in the plurality of pixel regions can be decreased appropriately, such that the pixel aperture ratio of the array substrate is effectively increased. Thus, the display apparatus that is manufactured by using the array substrate has a better display effect.

It should be noted that the plurality of pixel regions 100a of the first base 100 in the array substrate 000 may be arranged in an array in a plurality of rows. The array substrate 000 may further include a sub-pixel disposed in each sub-pixel region in each pixel region 100a. In the present disclosure, the at least two color sub-pixel regions 102 in each pixel region 100a may include a red sub-pixel region, a green sub-pixel region, and a blue sub-pixel region. In this case, the sub-pixels in the array substrate 000 may include: a red sub-pixel R disposed in the red sub-pixel region, a green sub-pixel G disposed in the green sub-pixel region, a blue sub-pixel B disposed in the blue sub-pixel region, and a white sub-pixel W disposed in the white sub-pixel region 101. In each pixel region 100a, the red sub-pixel R, the green sub-pixel G, the blue sub-pixel B, and the white sub-pixel W can form one pixel.

In the embodiment of the present disclosure, the photosensitive device 200 in the array substrate 000 has a plurality of structures. The embodiment of the present disclosure is illustratively described by taking the following two optional implementations as examples.

Figure 3:
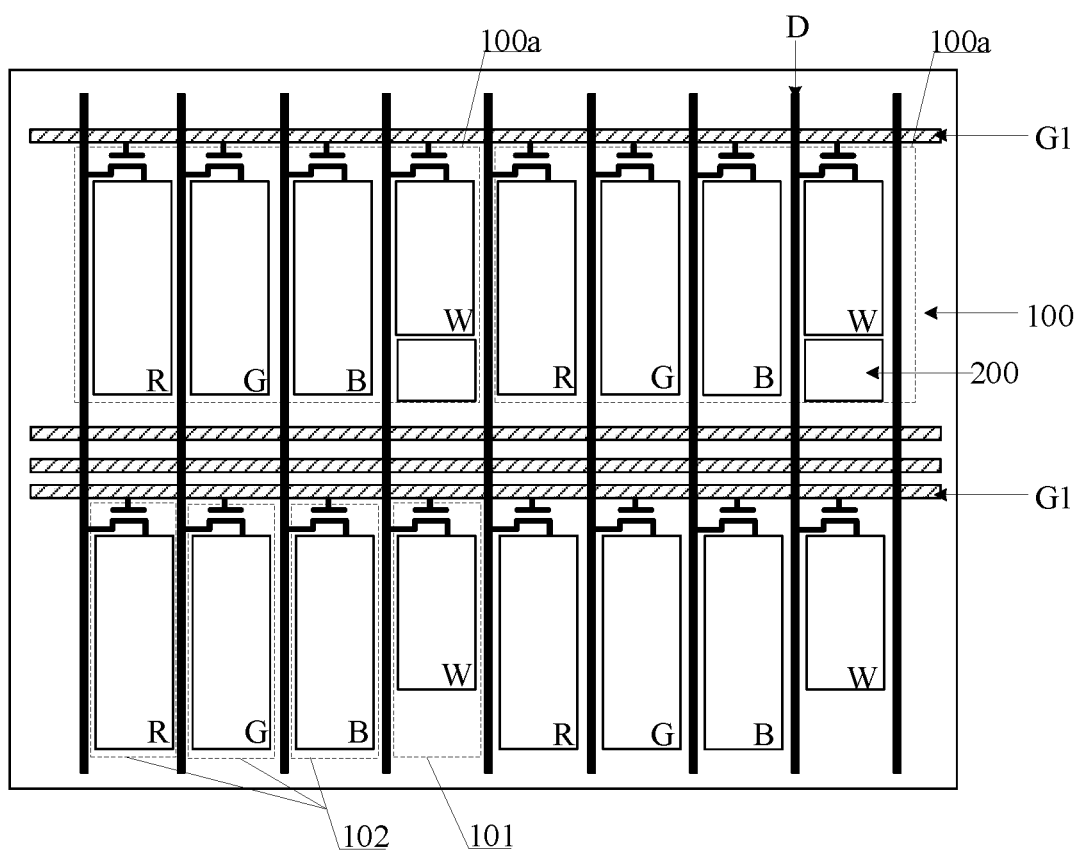
FIG. 3 is a top view of another array substrate according to an embodiment of the present disclosure.

In a first implementation, as shown in FIG. 3, which is a top view of another array substrate according to an embodiment of the present disclosure, the orthographic projection of the photosensitive device 200 in the array substrate 000 onto the first base 100 may be within the white sub-pixel region 102. In this case, because the orthographic projection of the photosensitive device 200 onto the first base 100 does not overlap with a region between the two adjacent rows of pixel regions 100a, the distance between the two adjacent rows of pixel regions 100a can be further reduced, so that the pixel aperture ratio of the array substrate 000 can be further increased.

Figure 4:
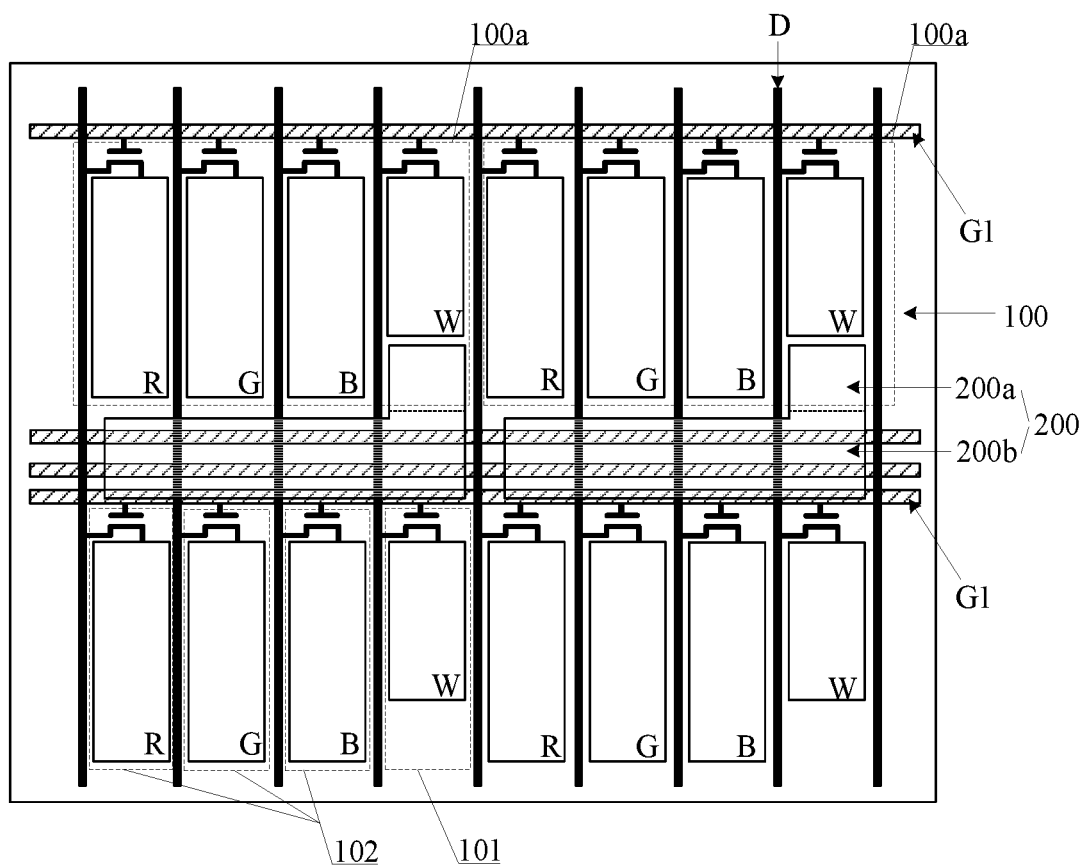
FIG. 4 is a top view of still another array substrate according to an embodiment of the present disclosure.

In a second implementation, as shown in FIG. 4, which is a top view of still another array substrate according to an embodiment of the present disclosure, the photosensitive device 200 in the array substrate 000 may include a first part 200a and a second part 200b. The orthographic projection of the first part 200a of the photosensitive device 200 onto the first base 100 may be within the white sub-pixel region 101, and the orthographic projection of the second part 200b of the photosensitive device 200 onto the first base 100 may be between the two adjacent rows of pixel regions 100a. In this case, the area of the orthographic projection of each photosensitive device 200 onto the first base 100 is relatively large, so that the accuracy of recognizing fingerprints by the photosensitive device 200 can be improved.

In the embodiment of the present disclosure, as shown in FIG. 3 and FIG. 4, the array substrate 000 may further include a plurality of first gate lines G1 arranged in an array on the first base 100 and a plurality of data lines D arranged in an array on the first base 100. The plurality of first gate lines G1 arranged in an array and the plurality of data lines D arranged in an array can define a plurality of sub-pixel regions (that is, the white sub-pixel regions 101 and the color sub-pixel regions 102). In the present disclosure, the sub-pixels in the array substrate 000 may be arranged in a plurality of rows in the extension direction of the first gate line G1, or may be arranged in a plurality of columns in the extension direction of the data line D. Each row of sub-pixels need to be connected to one first gate line G1, and each column of sub-pixels need to be connected to one data line D. It should be noted that one first gate line G1 or two first gate lines G1 may be arranged between the two adjacent rows of pixel regions 100a in the array substrate 000. When two first gate lines G1 are arranged between the two adjacent rows of pixel regions 100a, the two first gate lines G1 are respectively connected to sub-pixels in the two adjacent rows of pixel regions 100a. For example, one of the two first gate lines G1 may be connected to an odd-numbered row of sub-pixels, and the other first gate line G1 may be connected to an even-numbered row of sub-pixels.

Optionally, the at least two color sub-pixel regions 102 and the white sub-pixel region 101 in each pixel region 100a may be arranged in one row. Alternatively, the at least two color sub-pixel regions 102 and the white sub-pixel region 101 in each pixel region 100a may be arranged in an array in two rows and two columns. In this case, the red sub-pixel R, the green sub-pixel G, the blue sub-pixel B, and the white sub-pixel W in each pixel may be arranged in one row. Alternatively, the red sub-pixel R, the green sub-pixel G, the blue sub-pixel B, and the white sub-pixel W in each pixel may be arranged in an array in two rows and two columns.

Figure 5:
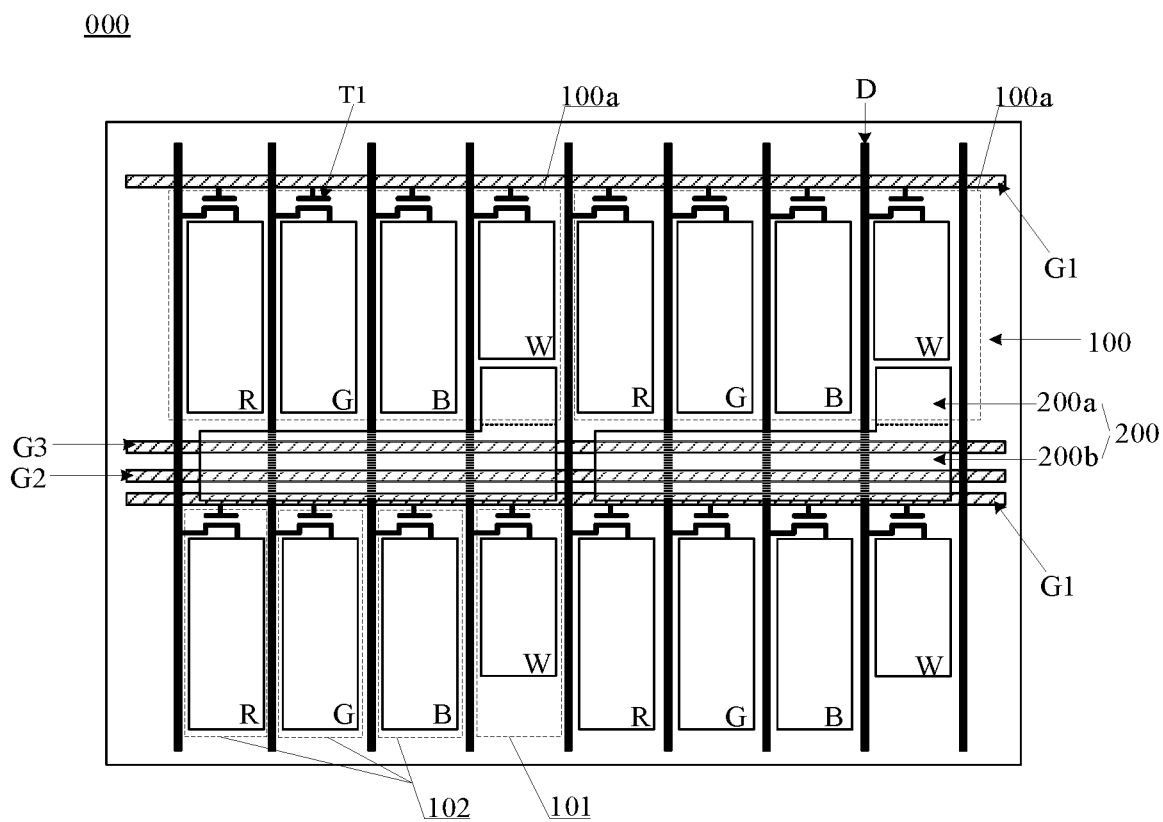
FIG. 5 is a top view of an array substrate according to another embodiment of the present disclosure.
Figure 6:
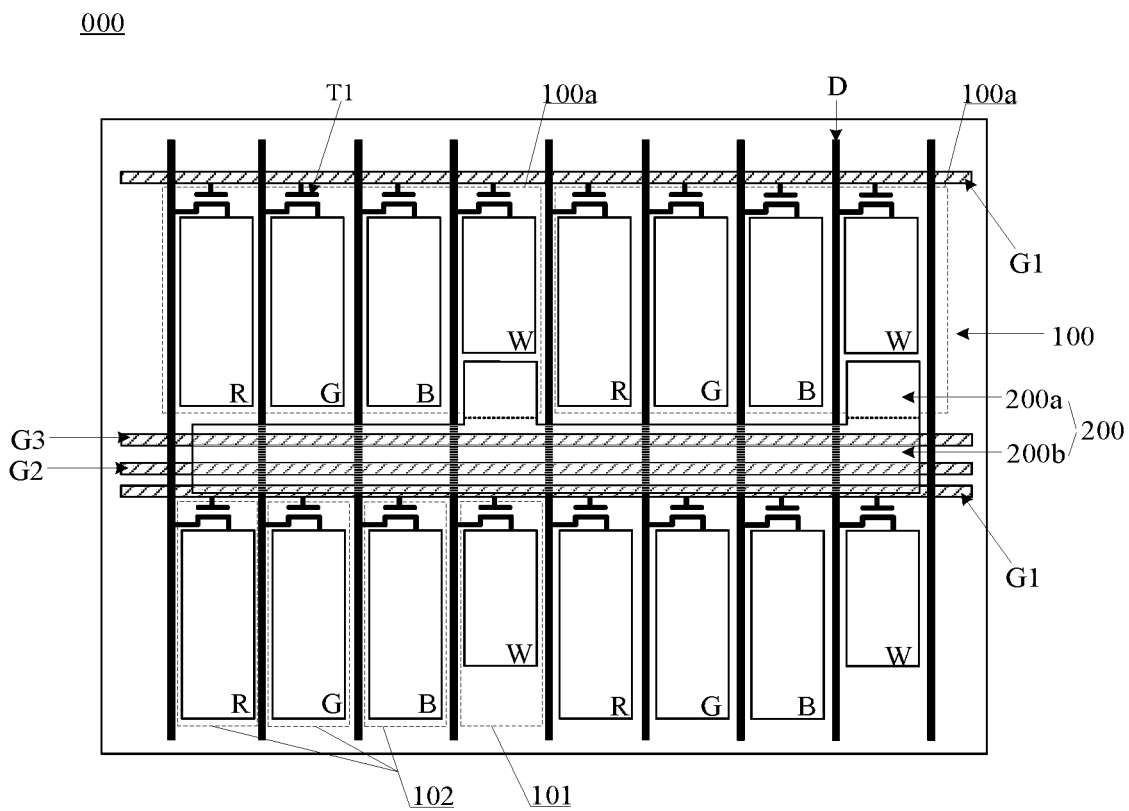
FIG. 6 is a top view of another array substrate according to another embodiment of the present disclosure.

It should be noted that when different quantities of first gate lines G1 are disposed between different two adjacent rows of pixel regions 100a in the array substrate 000 or the sub-pixels are arranged in different manners in different pixels, the structure of the array substrate 000 is also different. The embodiment of the present disclosure is illustratively described by taking the following three cases as examples:

In a first case, reference is made to FIG. 5 and FIG. 6. FIG. 5 is a top view of an array substrate according to another embodiment of the present disclosure and FIG. 6 is a top view of another array substrate according to another embodiment of the present disclosure. The red sub-pixel R, the green sub-pixel G, the blue sub-pixel B, and the white sub-pixel W in each pixel in the array substrate 000 are arranged in one row, and one first gate line G1 is arranged between two adjacent rows of pixel regions 100a in the array substrate 000.

In a possible implementation, as shown in FIG. 5, the quantity of the plurality of photosensitive devices 200 is equal to the quantity of the plurality of pixel regions 100a. The plurality of photosensitive devices 200 and the plurality of pixel regions 100a are disposed in one-to-one correspondence. For example, the orthographic projection of the photosensitive device 200 onto the first base 100 is at least partially within the white sub-pixel region 101 in a corresponding pixel region 100a. In this case, the PPI (pixels per inch) of the pixel region in the array substrate 000 is equal to the PPI of the photosensitive devices 200. It should be noted that FIG. 5 is schematically described by taking an example in which a part (that is, the orthographic projection of the first part 200a of the photosensitive device 200 onto the first base 100) of the orthographic projection of the photosensitive device 200 onto the first base 100 is within the white sub-pixel region 101 in the corresponding pixel region 100a and the part (that is, the orthographic projection of the second part 200b of the photosensitive device 200 onto the first base 100) is between two adjacent rows of pixel regions 100a.

In another possible implementation, as shown in FIG. 6, each photosensitive device 200 in the array substrate 000 may correspond to two pixel regions 100a, and the arrangement direction of the two pixel regions 100a is parallel to the extension direction of the first gate line G1. The photosensitive device 200 includes two first parts 200a, and the two first parts 200a of the photosensitive device 200 are respectively disposed in the white sub-pixel regions 101 in two corresponding pixel regions 100a. In this case, the PPI of the photosensitive device 200 in the array substrate 000 is approximately 0.63 times the PPI of the pixel region.

Figure 7:
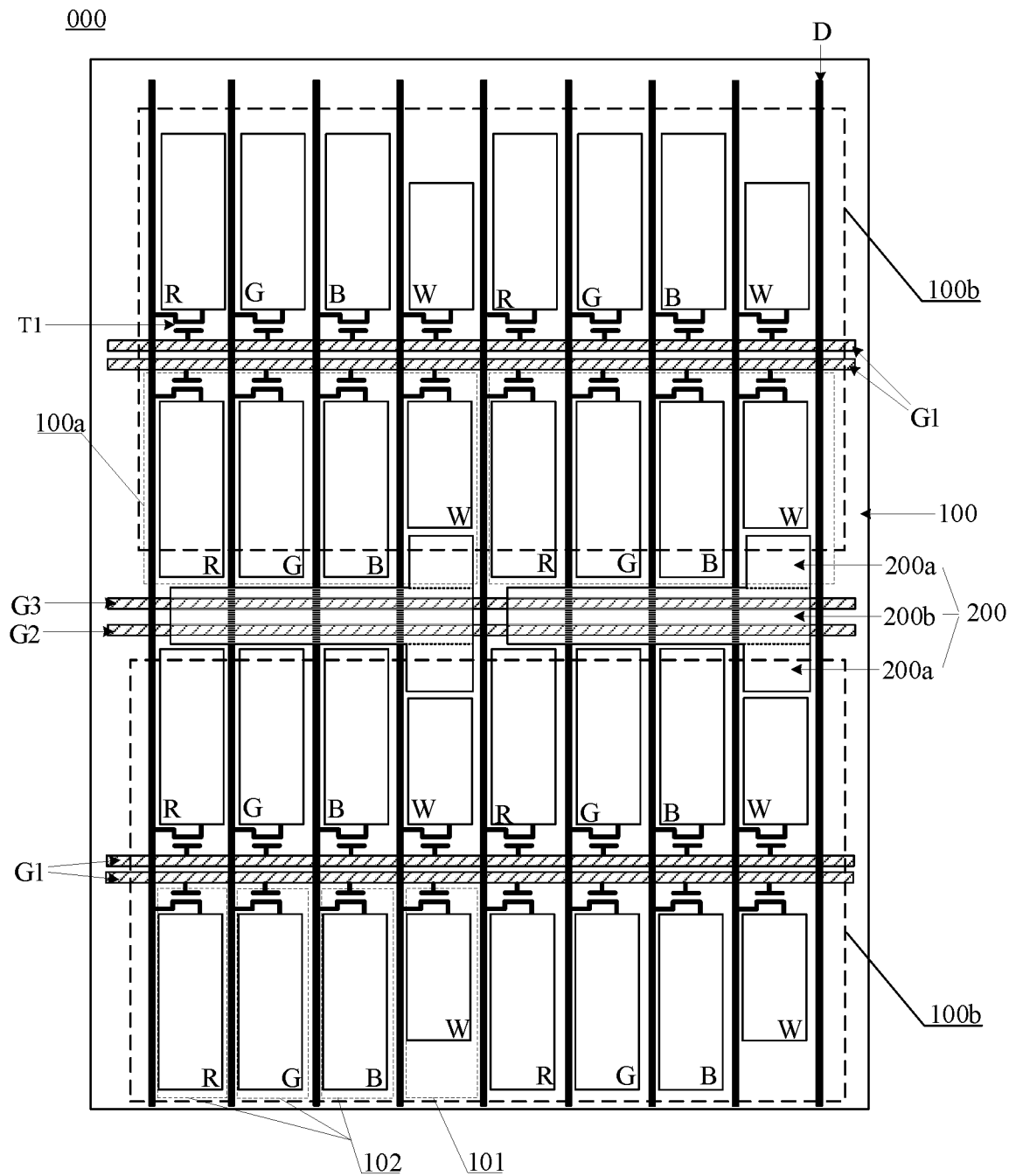
FIG. 7 is a top view of an array substrate according to still another embodiment of the present disclosure.
Figure 8:
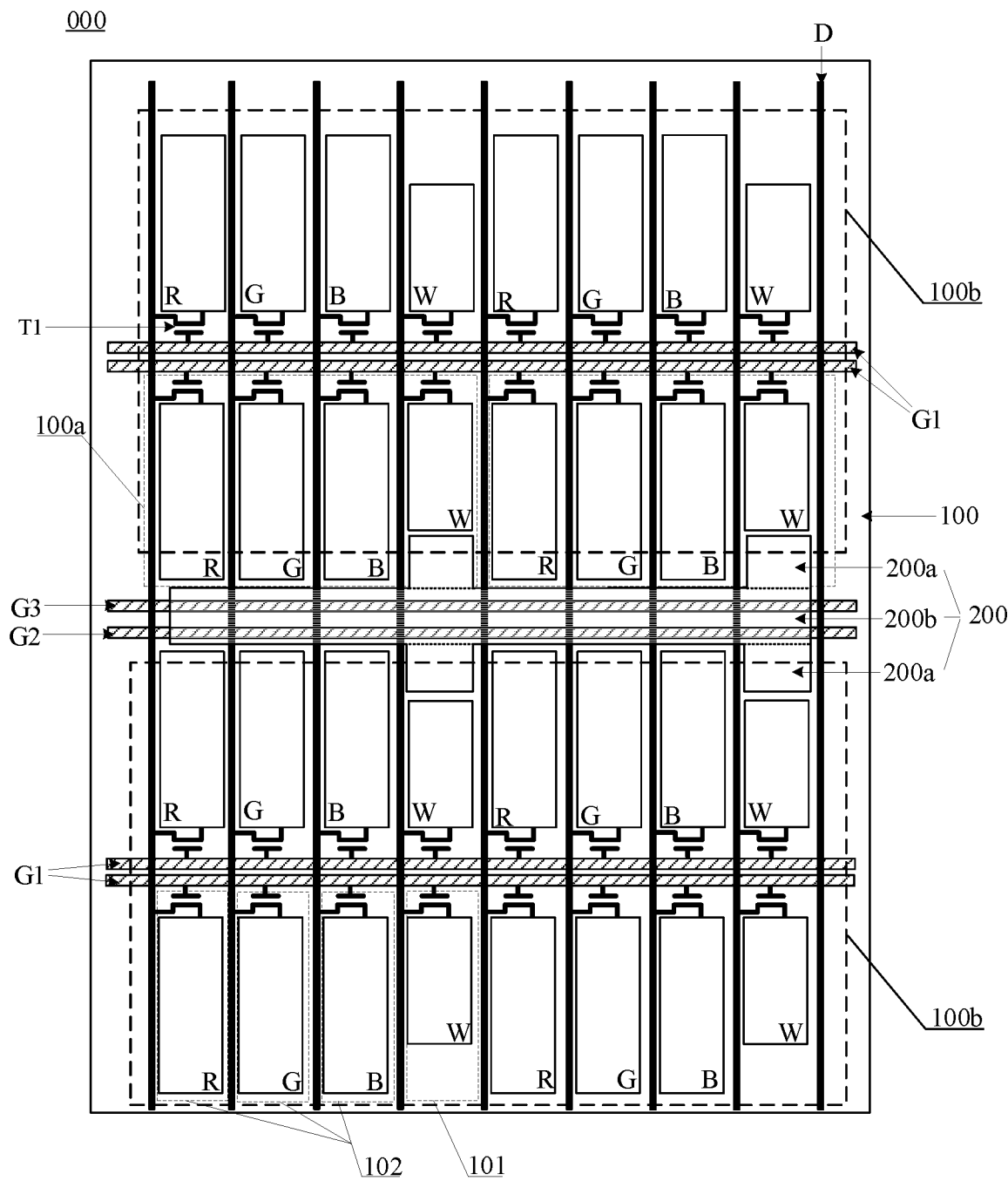
FIG. 8 is a top view of another array substrate according to still another embodiment of the present disclosure.

In a second case, reference is made to FIG. 7 and FIG. 8. FIG. 7 is a top view of an array substrate according to still another embodiment of the present disclosure and FIG. 8 is a top view of another array substrate according to still another embodiment of the present disclosure. The red sub-pixel R, the green sub-pixel G, the blue sub-pixel B, and the white sub-pixel W in each pixel in the array substrate 000 are arranged in one row, and two first gate lines G1 are arranged between two adjacent rows of pixel regions 100a in the array substrate 000. The two first gate lines G1 may be respectively connected to two rows of sub-pixels in the two adjacent rows of pixel regions 100a. In this case, the orthographic projection of the second part 200b of the photosensitive device 200 onto the first base 100 is between two adjacent target regions 100b. The target region 100b includes two adjacent rows of pixel regions 100a and a region that is between the two rows of pixel regions 100a and is provided with the two first gate lines G1.

In this case, a photosensitive device 200 is not provided between two rows of pixel regions 100a disposed on two sides of the two first gate lines G1, and thus the distance between the two rows of pixel regions 100a is not affected. Thus, the pixel aperture ratio of the array substrate 000 can be further increased.

In the present disclosure, the orthographic projection of the first part 200a of the photosensitive device 200 in the array substrate 000 onto the first base 100 is within two white sub-pixel regions 101, and the two white sub-pixel regions 101 are respectively disposed in two adjacent rows of pixel regions 100a. In this way, it can be ensured that the area of the orthographic projection of the photosensitive device 200 onto the first base 100 is relatively large.

In a possible implementation, as shown in FIG. 7, each photosensitive device 200 in the array substrate 000 may correspond to two pixel regions 100a, and the arrangement direction of the two pixel regions 100a is parallel to the extension direction of the data line D. The photosensitive device 200 includes two first parts 200a, and the two first parts 200a of the photosensitive device 200 are respectively disposed in the white sub-pixel regions 101 in two corresponding pixel regions 100a. In this case, the PPI of the photosensitive device 200 in the array substrate 000 is approximately 0.63 times the PPI of the pixel region.

In another possible implementation, as shown in FIG. 8, each photosensitive device 200 in the array substrate 000 may correspond to four pixel regions 100a, and the four pixel regions 100a are arranged in an array in two rows and two columns in the extension direction of the first gate line G1 and the extension direction of the data line D. The photosensitive device 200 includes four first parts 200a, and the four first parts 200a are respectively disposed in the white sub-pixel regions 101 in four corresponding pixel regions 100a. In this case, the PPI of the photosensitive device 200 in the array substrate 000 is half the PPI of the pixel region.

Figure 9:
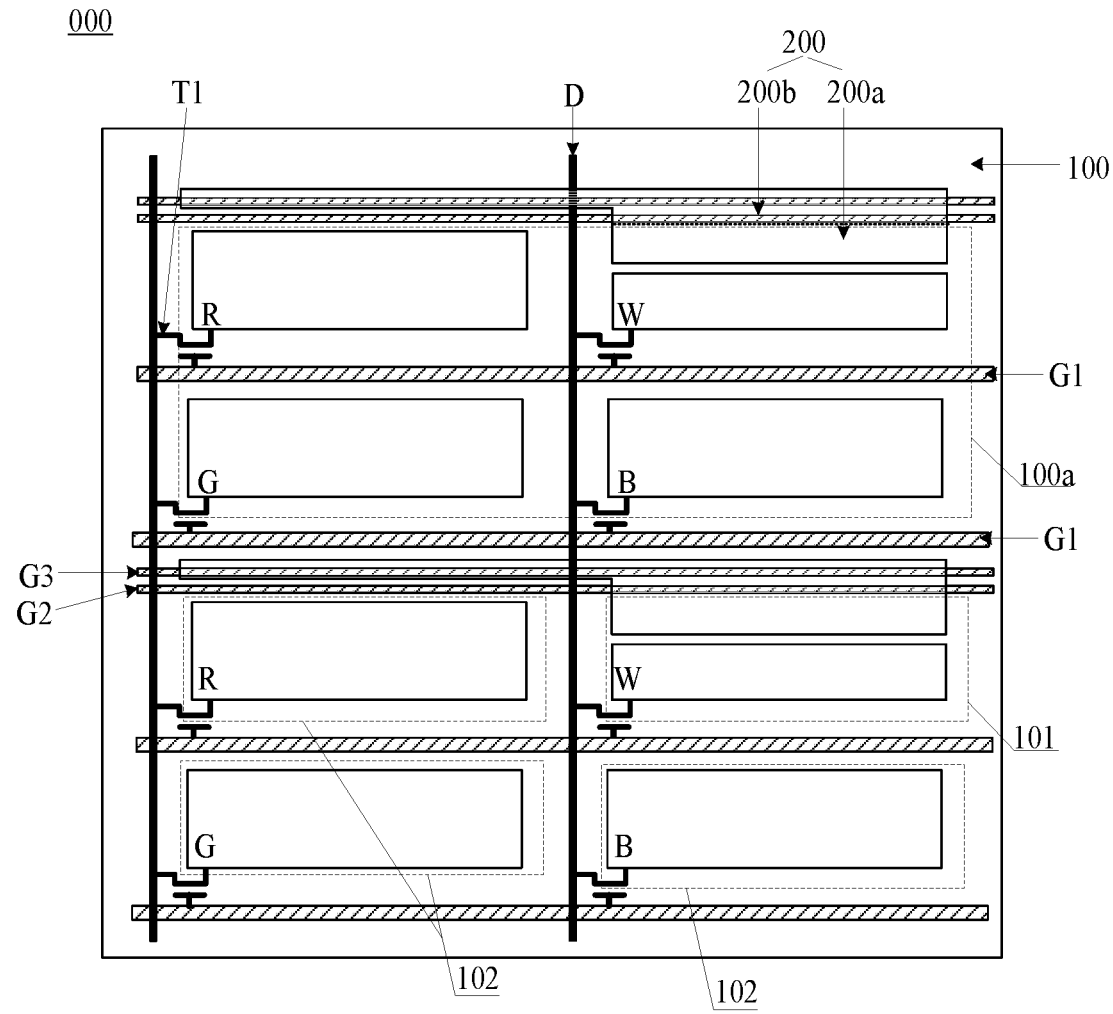
FIG. 9 is a top view of an array substrate according to yet another embodiment of the present disclosure.
Figure 10:
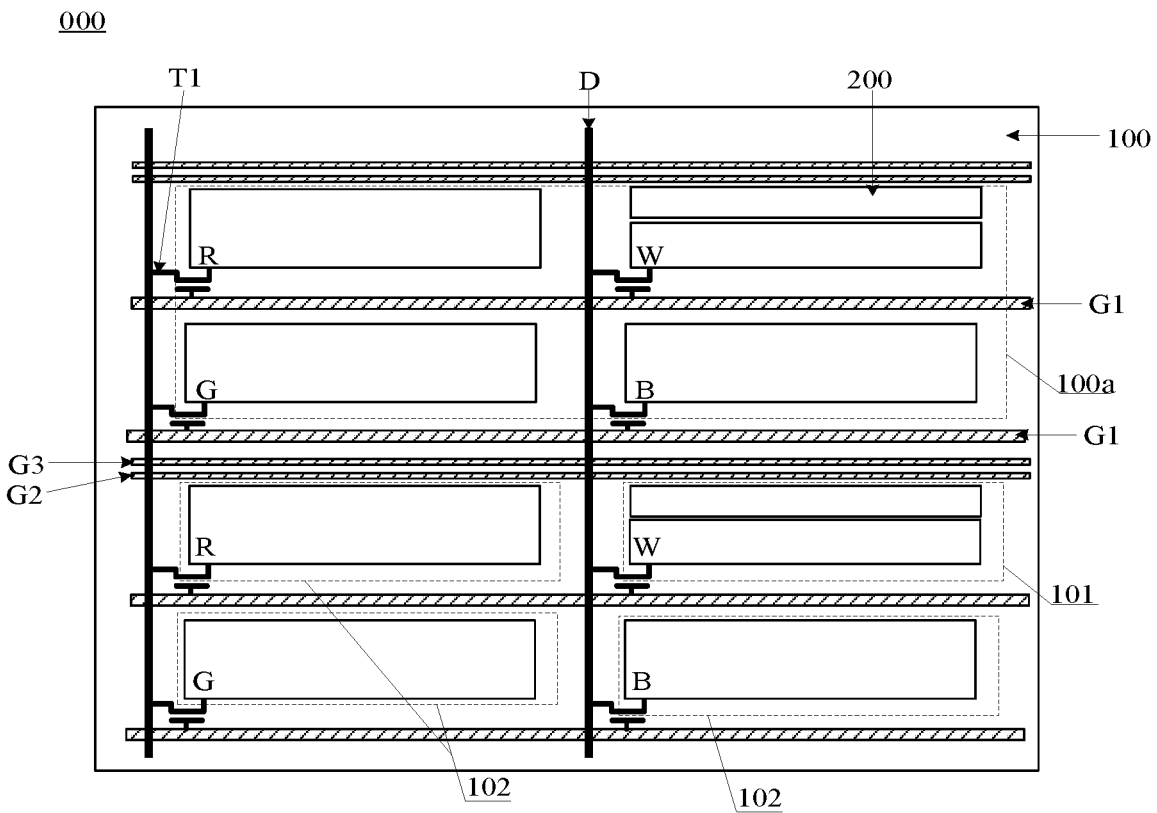
FIG. 10 is a top view of another array substrate according to yet another embodiment of the present disclosure.

In a third case, reference is made to FIG. 9 and FIG. 10. FIG. 9 is a top view of an array substrate according to yet another embodiment of the present disclosure and FIG. 10 is a top view of another array substrate according to yet another embodiment of the present disclosure. The red sub-pixel R, the green sub-pixel G, the blue sub-pixel B, and the white sub-pixel W in each pixel in the array substrate 000 are arranged in an array in two rows and two columns, and one first gate line G1 is arranged between two adjacent rows of pixel regions 100a in the array substrate 000. For example, the quantity of the plurality of photosensitive devices 200 is equal to the quantity of the plurality of pixel regions 100a. The plurality of photosensitive devices 200 and the plurality of pixel regions 100a are disposed in one-to-one correspondence. The orthographic projection of the photosensitive device 200 onto the first base 100 is at least partially within the white sub-pixel region 101 in the corresponding pixel region 100a. In this case, the PPI of the pixel region in the array substrate 000 is equal to the PPI of the photosensitive device 200.

In an optional implementation, as shown in FIG. 9, a part of the orthographic projection of the photosensitive device 200 onto the first base 100 (that is, the orthographic projection of the first part 200a of the photosensitive device 200 onto the first base 100) is within the white sub-pixel region 101 in a corresponding pixel region 100a and the part of the orthographic projection of the photosensitive device 200 onto the first base 100 (that is, the orthographic projection of the second part 200b of the photosensitive device 200 onto the first base 100) is between two adjacent rows of pixel regions 100a.

In another possible implementation, as shown in FIG. 10, the orthographic projection of the photosensitive device 200 onto the first base 100 is completely within the white sub-pixel region 101 in the corresponding pixel region 100a.

Figure 11:
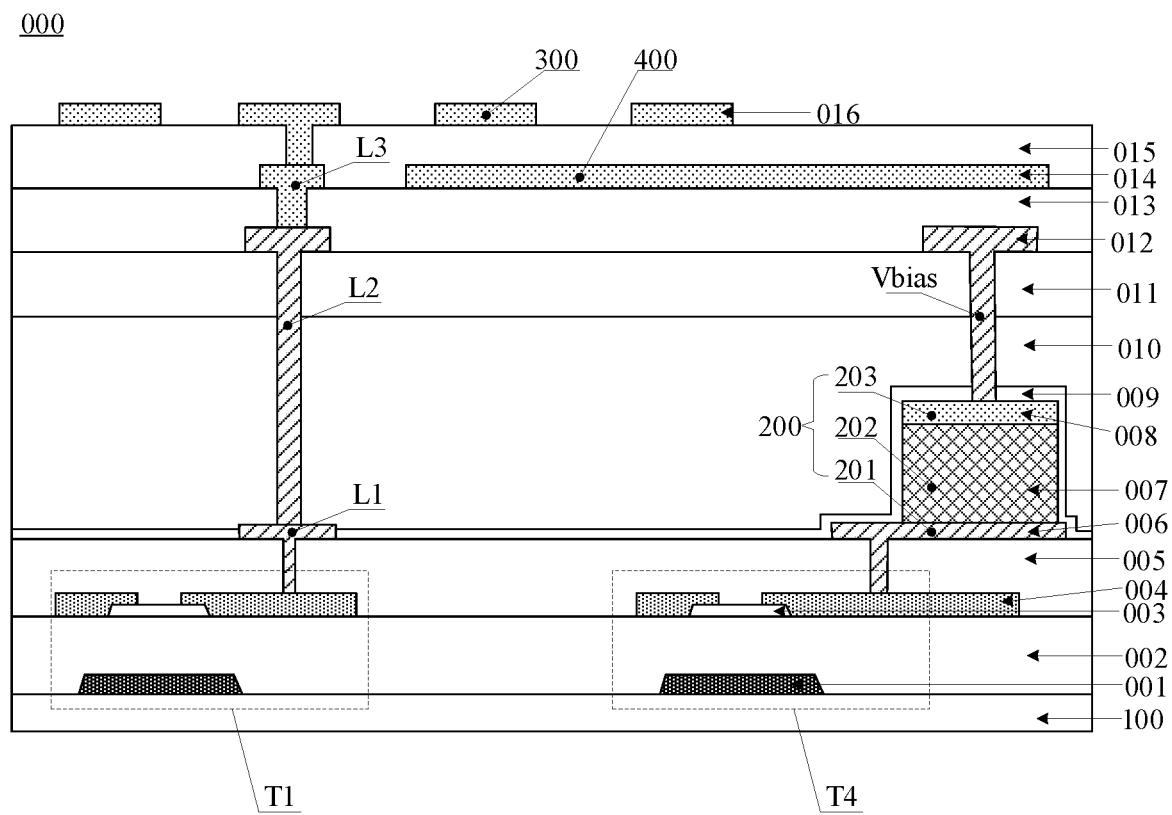
FIG. 11 is a schematic structural diagram of film layers of an array substrate according to an embodiment of the present disclosure.

Optionally, as shown in FIG. 5 to FIG. 10, and with reference to FIG. 11, which is a schematic structural diagram of film layers of an array substrate according to an embodiment of the present disclosure, each sub-pixel in the array substrate 000 may include a first transistor T1 disposed on the first base 100 as well as a pixel electrode 300 and a common electrode 400 that are disposed on a side of the first transistor T1 distal from the first base 100. The pixel electrode 300 may be connected to the first transistor T1. In the present disclosure, each sub-pixel may be connected to one first gate line G1 and one data line D by the first transistor T1. For example, the first electrode of the first transistor T1 may be connected to one data line D, the second electrode of the first transistor T1 may be connected to the pixel electrode 300 in the sub-pixel, and the gate of the first transistor T1 may be connected to one first gate line G1.

It should be noted that an insulating layer may be provided between the pixel electrode 300 and the common electrode 400 in each sub-pixel, and the common electrode 400 is closer to the first base 100 than the pixel electrode 300. The common electrode 400 may be a planar electrode, and the pixel electrode 300 may be a slit electrode.

It should be further noted that in the embodiment of the present disclosure, the first electrode may be one of a source and a drain, and the second electrode may be the other of the source and the drain.

Optionally, as shown in FIG. 11, the photosensitive device 200 in the array substrate 000 may include a light-shielding electrode 201, a photoelectric conversion layer 202, and a light-transmitting electrode 203 that are laminated. The light-shielding electrode 201 is closer to the first base 100 than the light-transmitting electrode 203. The photoelectric conversion layer 202 is a PIN structure formed of a P-type semiconductor layer, an intrinsic semiconductor layer, and an N-type semiconductor in a laminated fashion. For example, the material of the light-shielding electrode 201 may include a metal material. The material of the light-transmitting electrode 203 may include a transparent conductive material, for example, may be indium tin oxide (ITO), indium-doped zinc oxide (IZO), or the like.

In the present disclosure, the array substrate 000 may further include a driving circuit disposed on the first base 100 and electrically connected to the plurality of photosensitive devices 200. An orthographic projection of the driving circuit onto the first base 100 may be within an orthographic projection of a photosensitive device 200 connected to the driving circuit onto the first base 100.

Optionally, the array substrate 000 may further include a second gate line disposed on the first base 100 and connected to the driving circuit. The second gate line may be disposed between two adjacent rows of pixel regions 100a. When the photosensitive device 200 includes the second part 200b, the orthographic projection of the second gate line onto the first base 100 and the orthographic projection of the second part 200b of the photosensitive device 200 onto the first base 100 have an overlapped region. One second gate line or two second gate lines may be connected to the driving circuit. The embodiment of the present disclosure is schematically described by taking the following two exemplary implementations as examples:

In an exemplary implementation, when two second gate lines are connected to the driving circuit, as shown in FIG. 5 to FIG. 10, the two second gate lines are a second gate line G2 and a second gate line G3.

Figure 12:
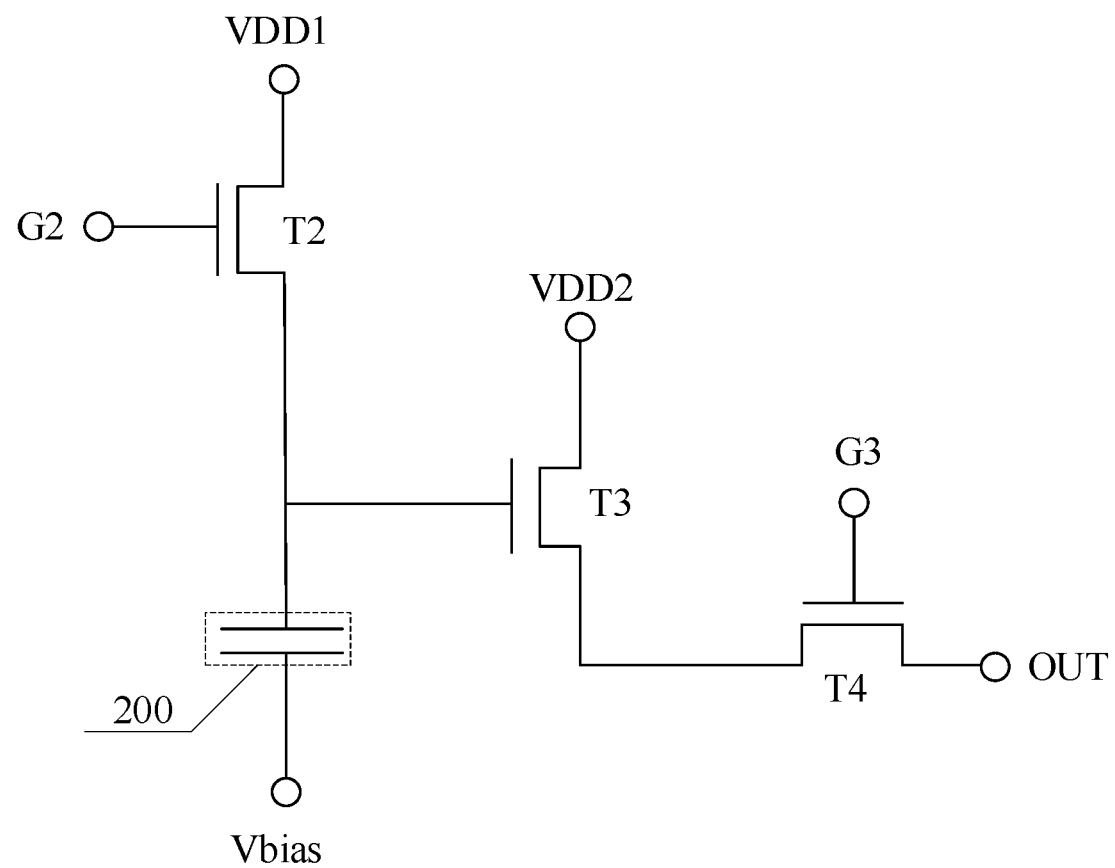
FIG. 12 is an equivalent circuit diagram of a driving circuit according to an embodiment of the present disclosure.

For example, as shown in FIG. 12, which is an equivalent circuit diagram of a driving circuit according to an embodiment of the present disclosure, the driving circuit may include a second transistor T2, a third transistor T3, and a fourth transistor T4 that are disposed in the same layer as the first transistor T1.

The gate of the second transistor T2 is electrically connected to the second gate line G2, the first electrode of the second transistor T2 is electrically connected to a first power line VDD1, and the second electrode of the second transistor T2 is electrically connected to one end (that is, the end at which the light-shielding electrode 201 is disposed) of the photosensitive device 200. The gate of the third transistor T3 is electrically connected to one end of the photosensitive device 200, the first electrode of the third transistor T3 is electrically connected to a second power line VDD2, and the second electrode of the third transistor T3 is electrically connected to the first electrode of the fourth transistor T4. The gate of the fourth transistor T4 is electrically connected to the second gate line G3, and the second electrode of the fourth transistor T4 is electrically connected to a read line OUT. The other end of the photosensitive device 200 (that is, the end at which the light-transmitting electrode 203 is disposed) may be electrically connected to a bias power line Vbias.

Figure 13:
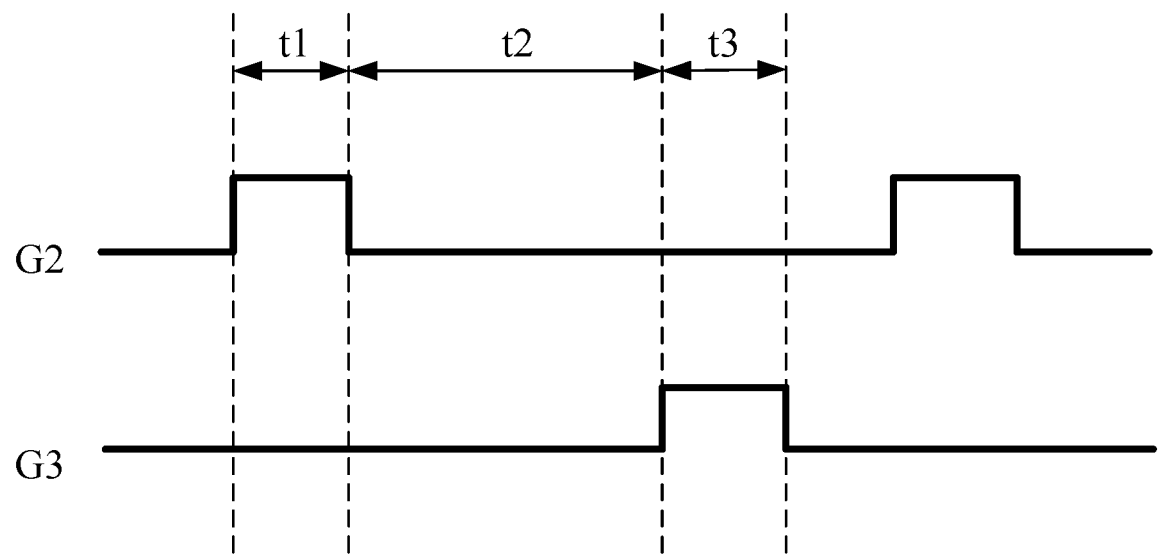
FIG. 13 is an operating timing diagram of the driving circuit shown in FIG. 12.

Referring to FIG. 13, which is an operating timing diagram of the driving circuit shown in FIG. 12, when the photosensitive device 200 operates, a bias voltage is applied to the other end of the photosensitive device 200 via the bias power line Vbias. In addition, in a reset phase t1, the second transistor T2 is turned on under the control of the second gate line G2, such that the first power line VDD1 resets the one end of the photosensitive device 200 via the second transistor T2 that is turned on. In a receiving phase t2, the transistors in the driving circuit are all in an off state and the photosensitive device 200 generates and stores a photocurrent signal in response to receiving visible light. In a reading phase t3, the third transistor T3 is turned on under the control of the photocurrent signal stored in the photosensitive device 200, amplifies the photocurrent signal and then writes the amplified photocurrent signal into the fourth transistor T4. The fourth transistor T4 is turned on under the control of the second gate line G3, and writes the amplified photocurrent signal into the read line OUT.

In addition, to simplify the manufacturing process of the array substrate, the first gate line G1, the second gate line G2, and the second gate line G3 may be disposed in the same layer, and the first power line VDD1, the second power line VDD2, the read line OUT, and the data line D are disposed in the same layer.

Figure 14:
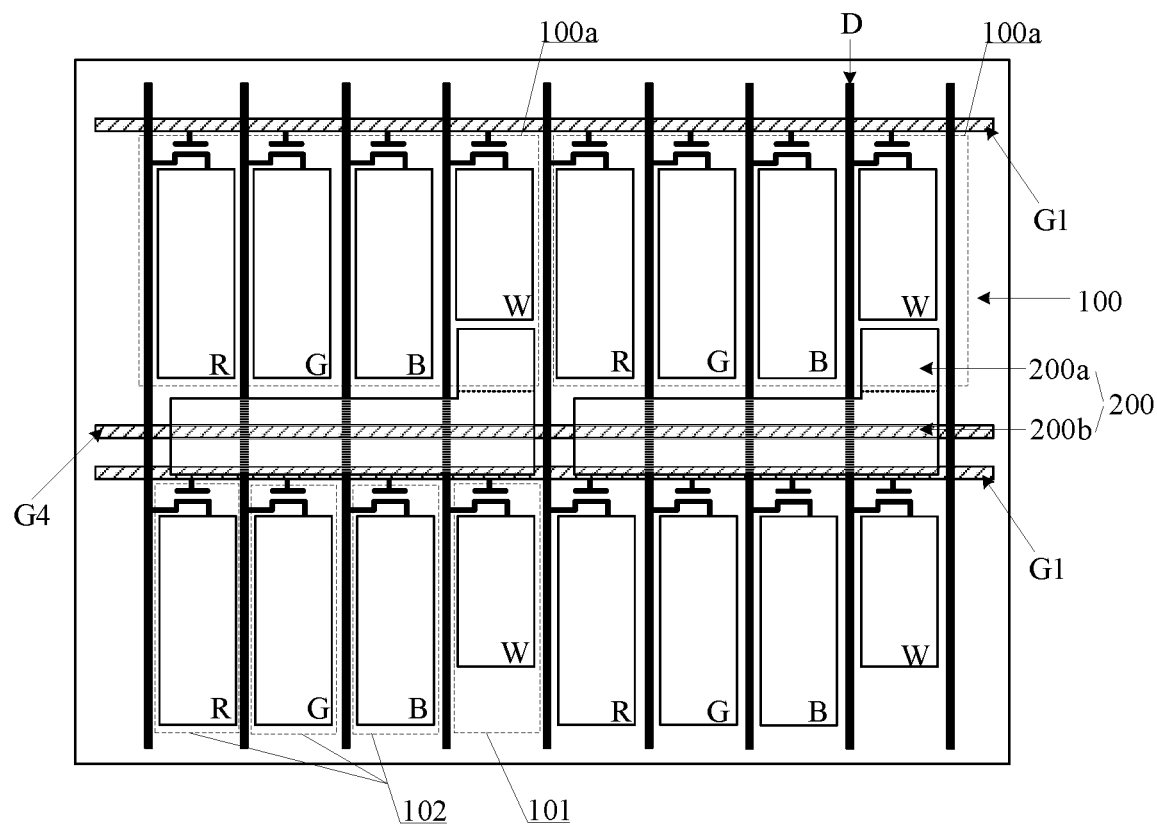
FIG. 14 is a top view of an array substrate according to still another embodiment of the present disclosure.

In a second exemplary implementation, when one second gate line is connected to the driving circuit, as shown in FIG. 14, which is a top view of an array substrate according to still another embodiment of the present disclosure, the second gate line is a second gate line G4.

Figure 15:
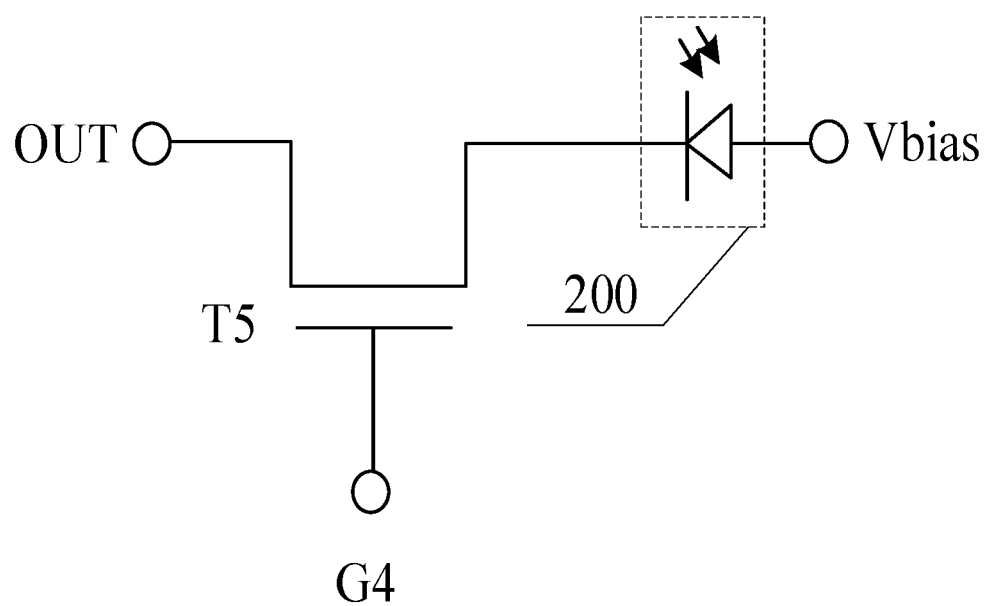
FIG. 15 is an equivalent circuit diagram of another driving circuit according to an embodiment of the present disclosure.

For example, as shown in FIG. 15, which is an equivalent circuit diagram of another driving circuit according to an embodiment of the present disclosure, the driving circuit may include a fifth transistor T5 disposed in the same layer as the first transistor T1.

The gate of the fifth transistor T5 is electrically connected to the second gate line G4. The first electrode of the fifth transistor T5 is electrically connected to one end (that is, the end at which the light-shielding electrode 201 is disposed) of the photosensitive device 200. The second electrode of the fifth transistor T5 is electrically connected to the read line OUT. The other end of the photosensitive device 200 (that is, the end at which the light-transmitting electrode 203 is disposed) may be electrically connected to the bias power line Vbias.

When the photosensitive device 200 operates, a bias voltage is applied to the other end of the photosensitive device 200 via the bias power line Vbias. In addition, when the second gate line G4 controls the gate of the fifth transistor T5 to turn on the fifth transistor T5, after the photosensitive device 200 generates and stores a photocurrent signal in response to receiving visible light, the photosensitive device writes the photocurrent signal into the read line OUT.

In addition, to simplify the manufacturing process of the array substrate, the first gate line G1 and the second gate line G4 may be disposed in the same layer.

In the embodiment of the present disclosure, as shown in FIG. 11, the array substrate 000 may include: a first metal conductive pattern 001, a gate insulating layer 002, an active layer pattern 003, a second metal conductive pattern 004, a first planarization layer 005, a third metal conductive pattern 006, a photoelectric conversion pattern 007, a first transparent conductive pattern 008, a protective layer 009, a second planarization layer 010, a first insulating layer 011, a fourth metal conductive pattern 012, a second insulating layer 013, a second transparent conductive pattern 014, a third insulating layer 015, and a third transparent conductive pattern 016 that are laminated on the first base 100.

The first metal conductive pattern 001 may include gates of the transistors, the first gate line G1, and the second gate line. It should be noted that the transistors in the embodiment of the present disclosure are the first transistor T1, the second transistor T2, the third transistor T3, and the fourth transistor T4.

The active layer pattern 003 may include active layers of the transistors.

The second metal conductive pattern 004 may include first electrodes and second electrodes of the transistors as well as the first power line VDD1, the second power line VDD2, the read line OUT, and the data line D.

The third metal conductive pattern 006 may include light-shielding electrodes 201 in the photosensitive devices 200 and a first connecting line L1 configured to connect the pixel electrode 300 and the first transistor T1.

The photoelectric conversion pattern 007 may include photoelectric conversion layers 202 in the photosensitive devices 200.

The first transparent conductive pattern 008 may include light-transmitting electrodes 203 in the photosensitive devices 200.

The fourth metal conductive pattern 012 may include a bias power line Vbias that is electrically connected to the light-transmitting electrode 203 in each photosensitive device 200 and a second connecting line L2 that is configured to connect the pixel electrode 300 and the first transistor T1.

The second transparent conductive pattern 014 may include common electrodes 400 in the sub-pixels and a third connecting line L3 that is configured to connect the pixel electrode 300 and the first transistor T1.

The third transparent conductive pattern 016 may include pixel electrodes 300 in the sub-pixels. The pixel electrodes 300 may be electrically connected to the first transistor T1 by the third connecting line L3, the second connecting line L2, and the first connecting line L1 sequentially.

In summary, the array substrate provided in the embodiment of the present disclosure includes a first base and a plurality of photosensitive devices disposed on the first base. The photosensitive device can recognize fingerprints. In this way, the screen-to-body ratio of the display apparatus manufactured by using the array substrate is effectively increased. When the orthographic projection of the photosensitive device in the array substrate onto the first base at least partially overlaps with a white sub-pixel region, as a part of the photosensitive device is disposed in the white sub-pixel region, under the premise of ensuring that the photosensitive device has relatively high accuracy of recognizing fingerprints, the distance between two adjacent rows of pixel regions in the plurality of pixel regions can be decreased appropriately, such that the pixel aperture ratio of the array substrate is effectively increased. Thus, the display apparatus that is manufactured by using the array substrate has a better display effect.

Figure 16:
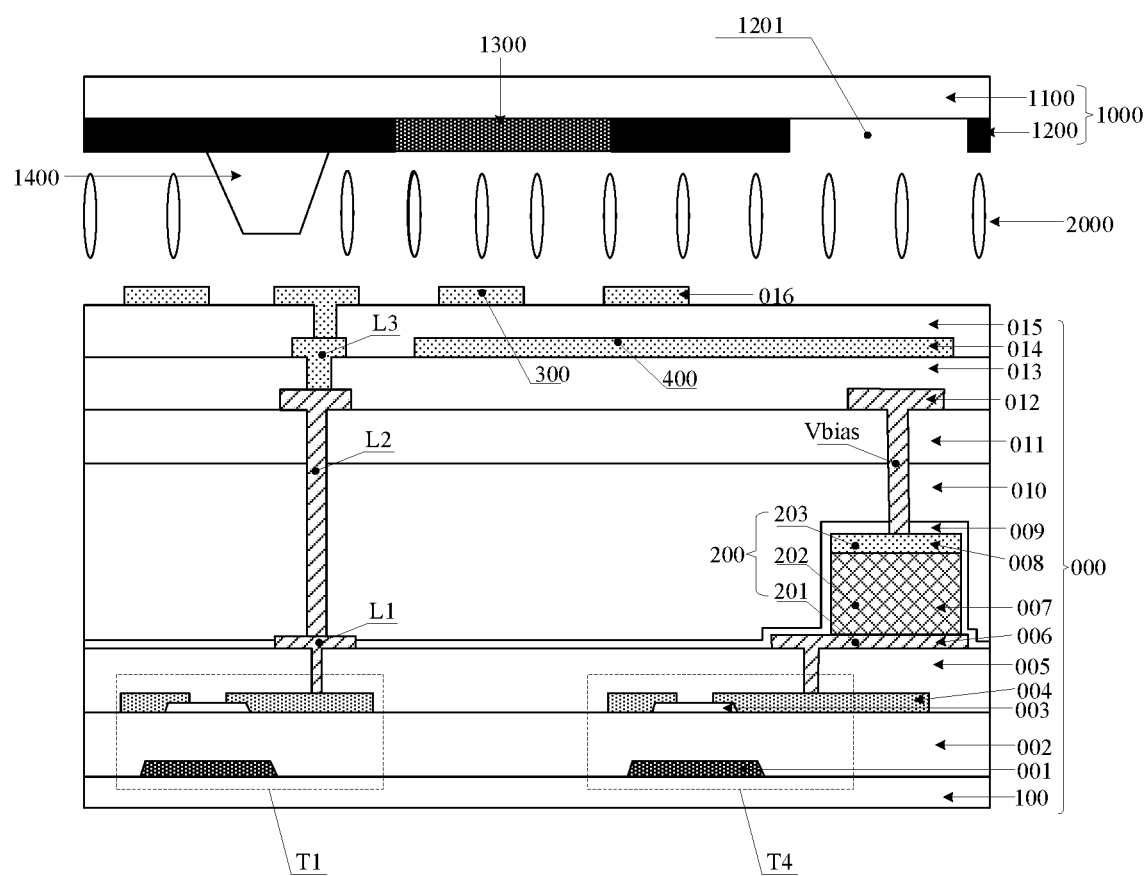
FIG. 16 is a schematic structural diagram of film layers of a liquid crystal display panel according to an embodiment of the present disclosure.

Referring to FIG. 16, which is a schematic structural diagram of film layers of a liquid crystal display panel according to an embodiment of the present disclosure, the liquid crystal display panel may include an array substrate 000 and a color filter substrate 1000 as well as a liquid crystal layer 2000 disposed between the array substrate 000 and the color filter substrate 1000. The array substrate 000 may include the array substrate in any one of FIG. 2 to FIG. 10 in the foregoing embodiments.

Optionally, the color filter substrate 1000 may include a second base 1100 and a black matrix 1200 that is disposed on the second base 1100. The black matrix 1200 is provided with an opening 1201. An orthographic projection of the opening 1201 of the black matrix 1200 onto the first base 100 may at least partially overlap with an orthographic projection of a photosensitive device 200 onto the first base 100. For example, the orthographic projection of the opening 1201 of the black matrix 1200 onto the first base 100 completely overlaps the orthographic projection of the photosensitive device 200 onto the first base 100. In this case, the orthographic projection of the black matrix 1200 onto the first base 100 and the orthographic projection of the photosensitive device 200 onto the first base 100 do not have an overlapped region, which can ensure that ambient light can irradiate the photosensitive device 200 and the photosensitive device 200 can recognize fingerprints.

Optionally, the color filter substrate 1000 may further include at least two color resist blocks 1300 of at least two colors that are disposed on the second base 1100 and correspond to at least two color sub-pixel regions. For example, the color resist blocks 1300 of at least two colors may include a red color resist block, a green color resist block, and a blue color resist block.

Optionally, the color filter substrate 1000 may further include a spacer 1400 disposed on a side of the black matrix 1200 distal from the second base 1100. The spacer 1400 can support the array substrate 000 and the color filter substrate 1000 to some extent.

An embodiment of the present disclosure further provides a method for manufacturing an array substrate, which is applied to manufacture the foregoing array substrate shown in FIG. 2. The method for manufacturing an array substrate may include:

providing a first base, and forming a plurality of photosensitive devices on the first base.

The first base is provided with a plurality of pixel regions. The pixel region includes a white sub-pixel region and at least two color sub-pixel regions. An orthographic projection of the photosensitive device onto the first base at least partially overlaps with the white sub-pixel region.

An embodiment of the present disclosure further provides another method for manufacturing an array substrate, which is applied to manufacture the foregoing array substrate shown in any of FIG. 3 to FIG. 10. The method for manufacturing an array substrate may include the following steps.

In step S1, a first metal conductive pattern is formed on a first base.

Optionally, the material of the first metal conductive pattern may include metal molybdenum (Mo), metal titanium (Ti), metal copper (Cu), metal aluminum (Al) or an alloy material. The first metal conductive pattern may include: gates in the transistors to be formed subsequently, a first gate line, a second gate line, and a third gate line.

For example, a first metal conductive film may be formed on the first base in any of deposition, coating, sputtering, and the like, and a one-time patterning process is then performed on the first metal conductive film to form the first metal conductive pattern. The one-time patterning process may include photoresist coating, exposure, development, etching, and photoresist stripping.

In step S2, a gate insulating layer is formed on the first metal conductive pattern.

Optionally, the material of the gate insulating layer may be silicon dioxide, silicon nitride, a high dielectric constant material, or the like.

For example, the gate insulating layer may be formed on the first base formed with the first metal conductive pattern in any of deposition, coating, sputtering and the like.

In step S3, an active layer pattern is formed on the gate insulating layer.

Optionally, the material of the active layer pattern may include a semiconductor material such as amorphous silicon or polycrystalline silicon. The active layer pattern may include active layers in the transistors to be formed subsequently.

For example, an active layer film may be formed on the first base formed with the gate insulating layer in any of deposition, coating, sputtering and the like, and a one-time patterning process is then performed on the active layer film to form the active layer pattern. The one-time patterning process may include photoresist coating, exposure, development, etching, and photoresist stripping.

In step S4, a second metal conductive pattern is formed on the active layer pattern.

Optionally, the material of the second metal conductive pattern may include metal Mo, metal Ti, metal Cu, metal Al or an alloy material. The second metal conductive pattern may include: first electrodes and second electrodes of the transistors to be formed subsequently, a first power line, a second power line, a read line, and a data line.

For example, a second metal conductive film may be formed on the first base formed with the active layer pattern in any of deposition, coating, sputtering and the like, and a one-time patterning process is then performed on the second metal conductive film to form the second metal conductive pattern. The one-time patterning process may include photoresist coating, exposure, development, etching, and photoresist stripping.

In step S5, a first planarization layer is formed on the second metal conductive pattern.

Optionally, the material of the first planarization layer may include an organic insulating material.

For example, the first planarization layer may be formed on the first base formed with the second metal conductive pattern in any of deposition, coating, sputtering and the like, and a one-time patterning process is then performed on the first planarization layer to form the first planarization layer with a via. The one-time patterning process may include photoresist coating, exposure, development, etching, and photoresist stripping.

In step S6, a third metal conductive pattern is formed on the first planarization layer.

Optionally, the material of the third metal conductive pattern may include metal Mo, metal Ti, metal Cu, metal Al or an alloy material. The third metal conductive pattern may include light-shielding electrodes in photosensitive devices to be formed subsequently and a first connecting line.

For example, a third metal conductive film may be formed on the first base formed with the first planarization layer in any of deposition, coating, sputtering and the like, and a one-time patterning process is then performed on the third metal conductive film to form the third metal conductive pattern. The one-time patterning process may include photoresist coating, exposure, development, etching, and photoresist stripping.

In step S7, a photoelectric conversion pattern is formed on the third metal conductive pattern.

Optionally, the photoelectric conversion pattern may include photoelectric conversion layers in the photosensitive devices to be formed subsequently. The photoelectric conversion layer is a PIN structure formed of a P-type semiconductor layer, an intrinsic semiconductor layer, and an N-type semiconductor layer in a laminated fashion.

For example, a P-type semiconductor film, an intrinsic semiconductor film, and an N-type semiconductor film may be sequentially formed on the first base formed with the third metal conductive pattern in any of deposition, coating, sputtering and the like, and a one-time patterning process is then performed on the N-type semiconductor film to form the photoelectric conversion pattern. The one-time patterning process may include photoresist coating, exposure, development, etching, and photoresist stripping.

In step S8, a first transparent conductive pattern is formed on the photoelectric conversion pattern.

Optionally, the material of the first transparent conductive pattern includes ITO or IZO. The first transparent conductive pattern may include light-transmitting electrodes in the photosensitive devices to be formed subsequently.

For example, a first transparent conductive film may be formed on the first base formed with the photoelectric conversion pattern in any of deposition, coating, sputtering and the like, and a one-time patterning process is then performed on the first transparent conductive film to form the photoelectric conversion pattern. The one-time patterning process may include photoresist coating, exposure, development, etching, and photoresist stripping.

In step S9, a protective layer, a second planarization layer, and a first insulating layer are sequentially formed on the first transparent conductive pattern.

Optionally, the materials of the protective layer and the first insulating layer both include silicon dioxide, silicon nitride, a high dielectric constant material, or the like. The material of the second planarization layer may include an organic insulating material.

For example, the protective layer, the second planarization layer, and the first insulating layer may be sequentially formed on the first base formed with the first transparent conductive pattern in any of deposition, coating, sputtering and the like, and a one-time patterning process is then performed on the first insulating layer to form the protective layer, the second planarization layer, and the first insulating layer with vias. The one-time patterning process may include photoresist coating, exposure, development, etching, and photoresist stripping.

In step S10, a fourth metal conductive pattern is formed on the first insulating layer.

Optionally, the material of the fourth metal conductive pattern may include metal Mo, metal Ti, metal Cu, metal Al or an alloy material. The fourth metal conductive pattern may include a bias power line electrically connected to the light-transmitting electrode of the photosensitive device as well as a second connecting line.

For example, a fourth metal conductive film may be formed on the first base formed with the first insulating layer in any of deposition, coating, sputtering and the like, and a one-time patterning process is then performed on the fourth metal conductive film to form the fourth metal conductive pattern. The one-time patterning process may include photoresist coating, exposure, development, etching, and photoresist stripping.

In step S11, a second insulating layer is formed on the fourth metal conductive pattern.

Optionally, the material of the second insulating layer includes silicon dioxide, silicon nitride, a high dielectric constant material, or the like.

For example, the second insulating layer may be formed on the first base formed with the fourth metal conductive pattern in any of deposition, coating, sputtering and the like, and a one-time patterning process is then performed on the second insulating layer to form a second insulating layer provided with a via. The one-time patterning process may include photoresist coating, exposure, development, etching, and photoresist stripping.

In step S12, a second transparent conductive pattern is formed on the second insulating layer.

Optionally, the material of the second transparent conductive pattern may include ITO or IZO. The second transparent conductive pattern may include a common electrode and a third connecting line.

For example, a second transparent conductive film may be formed on the first base formed with the second insulating layer in any of deposition, coating, sputtering and the like, and a one-time patterning process is then performed on the second transparent conductive film to form the second transparent conductive pattern. The one-time patterning process may include photoresist coating, exposure, development, etching, and photoresist stripping.

In step S13, a third insulating layer is formed on the second transparent conductive pattern.

Optionally, the material of the third insulating layer includes silicon dioxide, silicon nitride, a high dielectric constant material, or the like.

For example, the third insulating layer may be formed on the first base formed with the second transparent conductive pattern in any of deposition, coating, sputtering and the like, and a one-time patterning process is then performed on the third insulating layer to form the third insulating layer with a via. The one-time patterning process may include photoresist coating, exposure, development, etching, and photoresist stripping.

In step S14, a third transparent conductive pattern is formed on the third insulating layer.

Optionally, the material of the third transparent conductive pattern may include ITO or IZO. The third transparent conductive pattern may include a pixel electrode.

For example, a third transparent conductive film may be formed on the first base formed with the third insulating layer in any of deposition, coating, sputtering and the like, and a one-time patterning process is then performed on the third transparent conductive film to form the third transparent conductive pattern. The one-time patterning process may include photoresist coating, exposure, development, etching, and photoresist stripping.

It may be clearly understood by persons skilled in the art that, for the purpose of convenient and brief description, for the operating principle and connection relationship of the structures in the array substrate described above, reference may be made to the corresponding content in the foregoing embodiment of the structure of the array substrate, and details are not described herein again.

An embodiment of the present disclosure further provides a display apparatus, including any foregoing liquid crystal display panel. The display apparatus may be an electronic paper, a mobile phone, a tablet computer, a television, a display, a notebook computer, a digital frame, a navigator or any other product or component having a display function.

It should be noted that in the accompanying drawings, the sizes of the layers and regions may be exaggerated for clear illustration. In addition, it can be understood that when an element or a layer is disposed "on" another element or layer, the element may be directly disposed on the another element or there may be an intervening layer. In addition, it can be understood that when an element or a layer is disposed "under" another element or layer, the element may be directly disposed under the another element or there may be more than one intervening layer or element. In addition, it can further be understood that when a layer or an element is disposed "between" two layers or elements, the layer or element may be the only one layer between the two layers or elements or there may be more than one intervening layer or element. Similar reference numerals indicate similar elements throughout the present disclosure.

In the present disclosure, the terms "first" and "second" are merely intended for description, but are not intended to indicate or imply relative importance. The term "a plurality of" refers to two or more, unless otherwise clearly specified.

Described above are merely optional embodiments of the present disclosure, but are not intended to limit the present disclosure. Any modifications, equivalent replacements, improvements and the like made within the spirit and principles of the present disclosure shall be included within the scope of protection of the present disclosure.

What is claimed is:

1. An array substrate, comprising:
   a first base, wherein the first base is provided with a plurality of pixel regions, and the pixel region comprises a white sub-pixel region and at least two color sub-pixel regions wherein the plurality of pixel regions are arranged in an array in a plurality of rows;
   a plurality of photosensitive devices disposed on the first base, wherein an orthographic projection of the photosensitive device onto the first base at least partially overlaps with the white sub-pixel region; and
   a plurality of first gate lines disposed on the first base, wherein two first gate lines are arranged between two adjacent rows of pixel regions, and the two first gate lines are respectively connected to sub-pixels in the two adjacent rows of pixel regions;
   wherein the photosensitive device comprises a first part and a second part, wherein an orthographic projection of the first part of the photosensitive device onto the first base is within the white sub-pixel region, and an orthographic projection of the second part of the photosensitive device onto the first base is between two adjacent target regions, the target region comprising two adjacent rows of pixel regions and a region that is between the two rows of pixel regions and is provided with the two first gate lines.

2. The array substrate according to claim 1, wherein the orthographic projection of the photosensitive device onto the first base is within the white sub-pixel region.

3. The array substrate according to claim 1, wherein the orthographic projection of the first part of the photosensitive device onto the first base is within two white sub-pixel regions, and the two white sub-pixel regions are respectively disposed in two adjacent rows of pixel regions.

4. The array substrate according to claim 1, wherein
a quantity of the plurality of photosensitive devices is equal to a quantity of the plurality of pixel regions, the plurality of photosensitive devices and the plurality of pixel regions are disposed in one-to-one correspondence, and the orthographic projection of the photosensitive device onto the first base at least partially overlaps with a white sub-pixel region in a corresponding pixel region.

5. The array substrate according to claim 1, wherein
the array substrate further comprises a driving circuit disposed on the first base and electrically connected to the photosensitive device, wherein an orthographic projection of the driving circuit onto the first base is within the orthographic projection of the photosensitive device onto the first base.

6. The array substrate according to claim 5, wherein
the array substrate further comprises a second gate line disposed on the first base and connected to the driving circuit, wherein the second gate line is disposed between two adjacent rows of pixel regions.

7. The array substrate according to claim 1, wherein
the photosensitive device comprises a light-shielding electrode, a photoelectric conversion layer, and a light-transmitting electrode that are laminated, wherein the light-shielding electrode is closer to the first base than the light-transmitting electrode.

8. The array substrate according to claim 1, wherein
the array substrate further comprises a sub-pixel disposed in each sub-pixel region in the pixel region, wherein the sub-pixel comprises a first transistor disposed on the first base as well as a pixel electrode and a common electrode that are disposed on a side of the first transistor distal from the first base, the pixel electrode being connected to the first transistor.

9. The array substrate according to claim 1, wherein
the at least two color sub-pixel regions comprise a red sub-pixel region, a green sub-pixel region, and a blue sub-pixel region; and
the at least two color sub-pixel regions and the white sub-pixel region in the pixel region are arranged in one row, or, the at least two color sub-pixel regions and the white sub-pixel region in the pixel region are arranged in an array in two rows and two columns.

10. The array substrate according to claim 1, wherein the second part of the photosensitive device extends along the first gate line, and the orthographic projection of the second part of the photosensitive device onto the first base covers a region between at least two color sub-pixel regions in two adjacent rows.

11. A liquid crystal display panel, comprising: an array substrate and a color filter substrate facing each other, and a liquid crystal layer disposed between the array substrate and the color filter substrate;
wherein the array substrate comprises:
a first base, wherein the first base is provided with a plurality of pixel regions, and the pixel region comprises a white sub-pixel region and at least two color sub-pixel regions wherein the plurality of pixel regions are arranged in an array in a plurality of rows;
a plurality of photosensitive devices disposed on the first base, wherein an orthographic projection of the photosensitive device onto the first base at least partially overlaps with the white sub-pixel region; and
a plurality of first gate lines disposed on the first base, wherein two first gate lines are arranged between two adjacent rows of pixel regions, and the two first gate lines are respectively connected to sub-pixels in the two adjacent rows of pixel regions;
wherein the photosensitive device comprises a first part and a second part, wherein an orthographic projection of the first part of the photosensitive device onto the first base is within the white sub-pixel region, and an orthographic projection of the second part of the photosensitive device onto the first base is between two adjacent target regions, the target region comprising two adjacent rows of pixel regions and a region that is between the two rows of pixel regions and is provided with the two first gate lines.

12. The liquid crystal display panel according to claim 11, wherein
the color filter substrate comprises a second base and a black matrix disposed on the second base, wherein the black matrix is provided with an opening, and an orthographic projection of the opening onto the first base at least partially overlaps with the orthographic projection of the photosensitive device onto the first base.

13. The liquid crystal display panel according to claim 12, wherein
the color filter substrate further comprises color resist blocks of at least two colors that are disposed on the second base and correspond to the at least two color sub-pixel regions.

14. The liquid crystal display panel according to claim 11, wherein the second part of the photosensitive device extends along the first gate line, and the orthographic projection of the second part of the photosensitive device onto the first base covers a region between at least two color sub-pixel regions in two adjacent rows.

15. A display apparatus, comprising a liquid crystal display panel comprising: an array substrate and a color filter substrate facing each other, and a liquid crystal layer disposed between the array substrate and the color filter substrate;
wherein the array substrate comprises:
a first base, wherein the first base is provided with a plurality of pixel regions, and the pixel region comprises a white sub-pixel region and at least two color sub-pixel regions wherein the plurality of pixel regions are arranged in an array in a plurality of rows;
a plurality of photosensitive devices disposed on the first base, wherein an orthographic projection of the photosensitive device onto the first base at least partially overlaps with the white sub-pixel region; and
a plurality of first gate lines disposed on the first base, wherein two first gate lines are arranged between two adjacent rows of pixel regions, and the two first gate lines are respectively connected to sub-pixels in the two adjacent rows of pixel regions;
wherein the photosensitive device comprises a first part and a second part, wherein an orthographic projection of the first part of the photosensitive device onto the first base is within the white sub-pixel region, and an orthographic projection of the second part of the photosensitive device onto the first base is between two adjacent target regions, the target region comprising two adjacent rows of pixel regions and a region that is between the two rows of pixel regions and is provided with the two first gate lines.

16. The display apparatus according to claim 15, wherein the second part of the photosensitive device extends along the first gate line, and the orthographic projection of the second part of the photosensitive device onto the first base covers a region between at least two color sub-pixel regions in two adjacent rows.

* * * * *